US006226287B1

United States Patent
Brady

(10) Patent No.: US 6,226,287 B1
(45) Date of Patent: May 1, 2001

(54) SYSTEM AND METHOD FOR INTEGRATING VOICE ON NETWORK WITH TRADITIONAL TELEPHONY

(75) Inventor: Patrick K. Brady, Downers Grove, IL (US)

(73) Assignee: Apropros Technology, Oakbrook Terrace, IL (US)

( * ) Notice: Subject to any disclaimer, the term of this patent is extended or adjusted under 35 U.S.C. 154(b) by 0 days.

(21) Appl. No.: 09/156,689

(22) Filed: Sep. 18, 1998

Related U.S. Application Data

(63) Continuation-in-part of application No. 08/813,970, filed on Mar. 3, 1997, which is a continuation of application No. 08/758,063, filed on Nov. 27, 1996, now Pat. No. 5,724,418, which is a continuation of application No. 08/595,861, filed on Feb. 6, 1996, now abandoned, which is a division of application No. 08/450,268, filed on May 25, 1995, now Pat. No. 5,557,668, which is a continuation of application No. 07/904,196, filed on Jun. 25, 1992, now abandoned.

(60) Provisional application No. 60/059,285, filed on Sep. 17, 1997.

(51) Int. Cl.[7] .................................................... H04L 12/64
(52) U.S. Cl. ....................... 370/352; 370/353; 379/93.16; 379/266
(58) Field of Search ..................................... 370/352, 353; 379/93.01, 93.09, 93.16, 265, 266

(56) References Cited

U.S. PATENT DOCUMENTS

| 4,289,934 | 9/1981 | Pitroda et al. . |
|---|---|---|
| 4,694,483 | 9/1987 | Cheung . |
| 4,785,408 | 11/1988 | Britton et al. . |
| 4,894,861 | 1/1990 | Fujioka . |
| 4,942,602 | 7/1990 | Baker, Jr. et al. . |
| 4,949,373 | 8/1990 | Baker, Jr. et al. . |
| 4,972,461 | 11/1990 | Brown et al. . |
| 5,001,710 | 3/1991 | Gawrys et al. . |
| 5,008,930 | 4/1991 | Gawrys et al. . |
| 5,036,535 | 7/1991 | Gechter et al. . |
| 5,097,528 | 3/1992 | Gursahaney et al. . |
| 5,144,653 | 9/1992 | Masuoka . |
| 5,168,515 | 12/1992 | Gechter et al. . |
| 5,181,239 | 1/1993 | Jolissaint . |
| 5,210,789 | 5/1993 | Jeffus et al. . |
| 5,214,688 | 5/1993 | Szlam et al. . |
| 5,247,569 | 9/1993 | Cave . |
| 5,402,474 | 3/1995 | Miller et al. . |
| 5,546,452 | * 8/1996 | Andrews et al. ..................... 379/219 |
| 5,557,668 | 9/1996 | Brady . |
| 5,610,910 | * 3/1997 | Focsaneanu et al. ................ 370/351 |
| 5,970,065 | * 10/1999 | Miloslavsky .......................... 370/352 |
| 6,002,760 | * 12/1999 | Gisby ................................... 379/266 |
| 6,157,655 | * 12/2000 | Shtivelman .......................... 370/412 |

OTHER PUBLICATIONS

Borton, George F. "Request and Status Links—A New Way to Link Computers and PBX", Feb. 1990 Business Communications Review, pp. 29–33.

Borton, George F. "Switch to Computer Links: The First Two Years" Mar. 1992 Business Communicatons Review, pp. 27–31.

* cited by examiner

*Primary Examiner*—Melvin Marcelo
(74) *Attorney, Agent, or Firm*—Shaw Pittman

(57) ABSTRACT

A link server is added to a traditional telecommunication system to allow seamless integration of voice on network ("VON") with traditional telephony. The link server accepts traditional telephony and voice on network calls. The link server can distribute the calls from a queue. The link server includes a voice card and network communication apparatus for acquiring VON data and either converting it to telephony data to forward calls to a PBX, or forwarding calls directly to a desktop.

19 Claims, 11 Drawing Sheets

| REMOTE ROUTER ID | PORT | FILTER TYPE | VALUE |
|---|---|---|---|
| HOUSTON | 1 | | |
| CHICAGO | 2 | | |
| CHICAGO | 2 | AGENT | J. JONES |
| CHICAGO | 2 | AGENT | A. ABLE |
| CHICAGO | 2 | CALL TYPE | SALES |
| HOUSTON | 1 | CALL TYPE | SERVICE |
| HOUSTON | 1 | MAINTENANCE | |

SYSTEM AND METHOD FOR INTEGRATING VOICE ON NETWORK WITH TRADITIONAL TELEPHONY

This application is a continuation-in-part of U.S. patent application Ser. No. 08/813,970, filed on Mar. 3, 1997 (still pending), hereby incorporated by reference in its entirety, which is a continuation of U.S. patent application Ser. No. 08/758,063, filed November 27, 1996 now U.S. Pat. No. 5,724,418, herein incorporated by reference in its entirety, which is a continuation of U.S. patent application Ser. No. 08/595,861, filed Feb. 6, 1996 (now abandoned) which is a divisional of U.S. patent application Ser. No. 08/450,268, filed May 25, 1995 (now U.S. Pat. No. 5,557,668 (the "668 patent") which is a continuation of U.S. patent application Ser. No. 07/904,196, filed Jun. 25, 1992 (now abandoned), hereby incorporated by reference in its entirety, and claims the benefit of U.S. Provisional Patent Application Ser. No. 60/059,285, filed Sep. 17, 1997, hereby incorporated by reference in its entirety.

FIELD OF INVENTION

The invention is a method for integrating voice on network with traditional telephony in a corporate network. In particular the invention relates to person-to-person calls and local and virtual call centers.

BACKGROUND OF THE INVENTION

The landscape of telephony is changing rapidly today. Traditional telephony networks no longer carry all the telephone traffic to a business. Some voice traffic is present today on public networks such as the Internet. This is termed voice on network ("VON"). Blending VON traffic with traditional telephone traffic presents difficult problems to corporations. These problems are found in both person-to-person and call center environments. Over time, a significant mix of voice traffic will shift to packet network sources. This shift will create a significant need to bring packet voice traffic into the existing telephony environments. For some years there will be a large market for adaptive rather than replacement systems.

The technology for packetizing voice for sending on networks is well known. Routing of packetized voice and the solution of inter-working of packetized voice in traditional telephony environments is still an area in need of significant innovation. A typical scheme for delivering VON calls to a PBX is to deliver VON calls to a gateway device which converts VON call traffic to T1 or analog. Output from this gateway looks like regular telephony traffic to the PBX. This approach enjoys the benefit of simplicity. Unfortunately much routing information and interactivity is lost in this arrangement. Calls from a packet network carry useful information relating to the caller and the caller's interests as well as history of interaction with a company's data systems such as Web servers. This call-related information is useful in forming accurate routing and meaningful dialogue with the caller—whether the dialogue is audio, video, or web interactive.

Calls to individuals in a company typically need less of this type of routing and interaction than calls to call centers. Due to the volume of calls handled, call centers must formalize the interaction and routing of calls. Individuals need routing and caller interaction but on a more dynamic basis. For instance, an individual needs to get calls routed to their current location—which may change. A caller also needs to be able to deliver messages and receive delivery of messages meant for their ears only. Whether calls are made to call centers or to individuals, there are significant ways to make these interactions more sophisticated and more valuable when the call is received through the network. However, this benefit is lost in conventional system because gateways strip out voice content and separate it from other call-related information.

As the shift to Voice on Network (VON) traffic occurs corporations need ways to bring this traffic into their existing networks. For the next several decades corporations will need a good way to handle both circuit switched voice calls and VON calls. Ultimately, the choice to replace existing infrastructure switching with all VON may occur. The same infrastructure used to facilitate the coexistence of VON with circuit switched voice needs to be capable of replacing circuit switched voice.

SUMMARY OF THE INVENTION

The present invention solves problems associated with the prior art by facilitating call routing through the PBX and the VON through a Link Server (LS). Calls are delivered to the link server as either traditional telephony (T1, analog, digital handset, or C link) or as SETUP messages in a VON call handling protocol. The LS inputs the calls and handles them appropriately: telephony calls receive voice prompts and responsive DTMF signals are collected, SETUP messages from VON protocols are sent and Web page interactions are established. Ultimately, whether the call is conventional telephony or VON, the processing required to handle it is reduced to a message to a call processing system.

In a preferred embodiment of the invention the call processing system is a call distributor such as that described in the '668 patent.

In alternate embodiments of the invention the LS places or tracks a traditional telephony call in a PBX or ACD—passing status messages to a program running on a desktop PC. The desktop PC program synchronizes the display of the incoming calls with messages received from the LS. For traditional telephony calls this means display information relating to calls being processed inside the PBX or ACD switching device. For VON calls this means display information relating to calls being processed by the LS.

In a queuing system calls from both sources are intermixed. Agents are able to see the source of calls and handle them appropriately. VON call handling can include web interaction with the caller before or instead of a full voice connection. The Agent or LS system can also offer a callback option to the caller over traditional telephony equipment when a better grade of voice quality is desired. Whatever the interaction, the result generally leads to a completed call to an agent. Traditional telephony calls are transferred or completed to the agent through the actions of the coordinated efforts of the agent desktop software and the LS and the PBX. For example, a switchhook transfer can be used to transfer the call held in the LS to the agent. Alternately, a message passed to the PBX/ACD via a switch link can be used to force completion of the call to the agent. VON call sources are passed the network address of the agent's PC (e.g., the IP address) so that a point-to-point connection can be established between the agent's PC and the VON call source.

For VON calls, the packetized voice must be decoded from the network. Preferably the decoding is performed in a server, for example at the LS or at the agent's PC. Regardless, the LS can coordinate the passage of the call to the agent. It may also perform an intermediate step of performing a voice connection to the caller to play prompts or audio messages while the caller is in queue before the connection is passed finally to an agent. In this way the connection can be moved from point to point in the call center.

When decoding occurs at the LS, the LS must have resource cards which perform the decoding function. One such card is that supplied by the Natural Microsystems Fusion product. Fusion cards decode/encode voice to/from the network on DSP's dedicated to each voice path. National Microsystems also has a card which contains a TCP/IP protocol stack. The TCP/IP protocol stack on the card is optimized for packet passing from and to this DSP card as well as to and from a data network. This is required to make the solution independent of the microprocessor and operating system of the LS (i.e., the solution is scaleable).

When decoding occurs at the desktop, resources are in a voice card similar to the QX2000 board made by Natural Microsystems. This card decodes/encodes packets from/to the network. In one embodiment of the invention the TCP/IP stack is running in the operating system of the PC. This is workable since only one call path and one card are present in the PC (scaleability is not an issue).

One of the benefits of this invention is allowing bridge technology to be built between existing switching and data network communications features. Because the device at the desktop is fully capable of VON and standard telephony both types of communications can be processed on a per-call basis. It is necessary in this model to have conferencing capabilities on the card in the PC. Conferencing at the desktop is made considerably simpler than centralized conferencing since both conversations meet at the desktop. Centralized conferencing of VON and traditional telephony would require VON to be converted to traditional telephony and passed into a switch. This is undesirable for reasons discussed above.

Local conferencing makes control software much simpler since there is no resource shared by multiple users. The usual data structures, linked lists, audit programs, race conditions, and other timing conditions and software logic are unnecessary. Overall control of the conference is maintained by the single user at the PC. Resources are dedicated to this user so no sharing is necessary. Conference setup and teardown information comes from a single source—the local PC. The result is reduced complexity plus the ability to bridge VON calls with traditional telephony.

The VON capabilities of the card at the desktop make it ideal for decoding voicemail messages delivered through data communication methods such as attached e-mail. Putting VON, a traditional telephony interface and bridging capabilities onto a single card makes it possible to create workgroup and wide area features which transcend the feature set of the traditional telephony switch. This makes it possible to create enhanced features and cost reduced capabilities not offered or possible from the traditional switch. An example of this is long distance calling. An originated call from the desktop could be placed through the traditional telephony switch or over the network depending on cost of connection or quality of connection. Companies with high bandwidth intranets can use them for voice either routinely or as a backup. Choice of voice path over the data network could be determined by query and response time across the network or by query to and positive response from a network traffic server.

When this Voice on Network and Traditional Telephony (VON/TT) device is part of a client server telephony system such as that described in the '668 patent still more capabilities and functions are available. An example is personalized call coverage. A caller from traditional telephony connection reaching a voice card on a PC can be given instructions programmed by the user which could include alerting, e-mail, transfer, forward, or conversion to VON for transfer or forward to other users in the system.

These and other objects of the present invention are described in greater detail in the detailed description of the invention, the appended drawings and the attached claims.

DETAILED DESCRIPTION OF THE PREFERRED EMBODIMENTS

Figure 1:
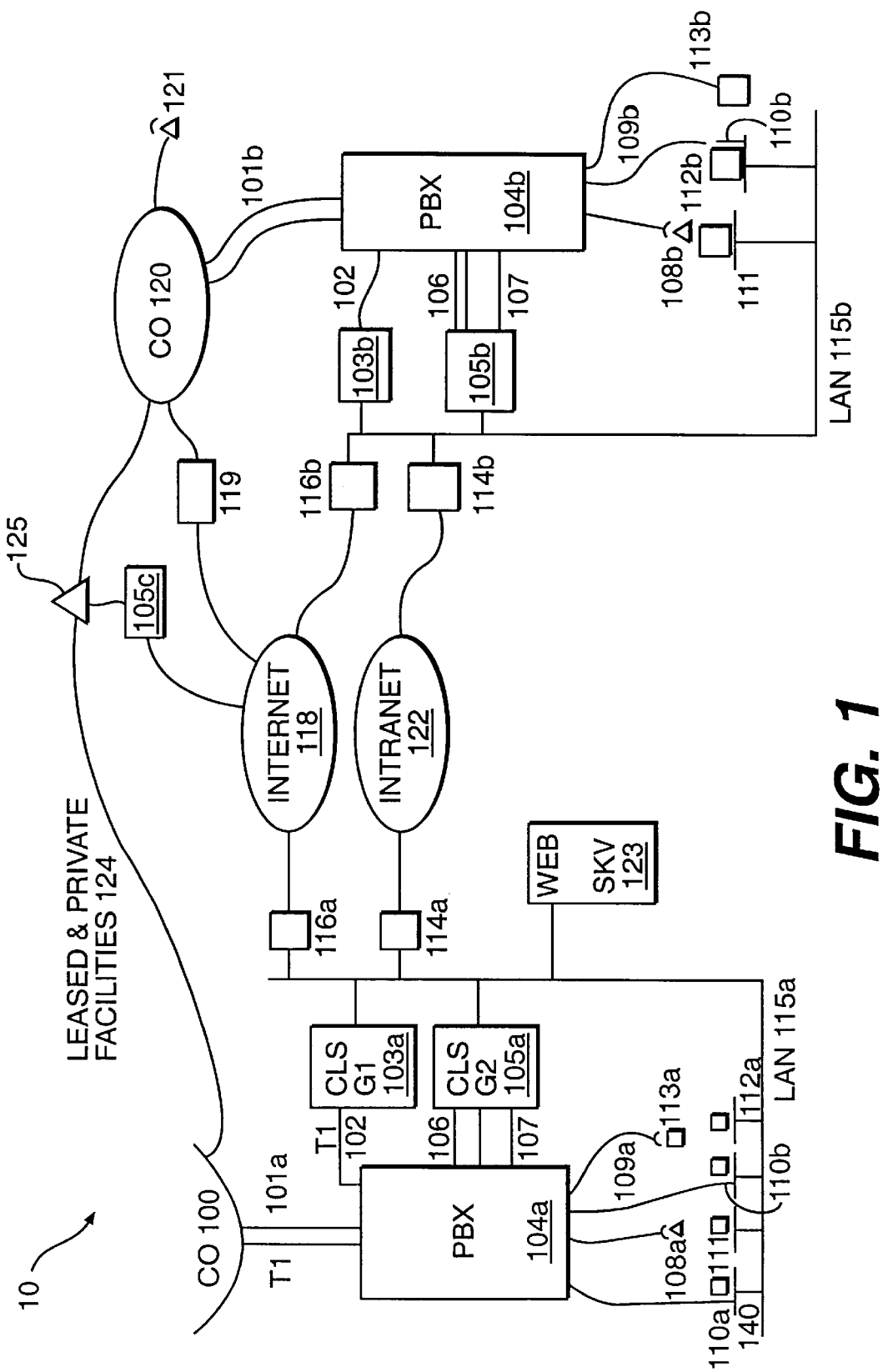
FIG. 1 is a schematic illustration of a telecommunication according to a preferred embodiment of the present invention.

FIG. 1 is a schematic illustration of a telecommunications system 10 according to a preferred embodiment of the present invention. System 10 is composed of Private Branch Exchanges (PBX) 104a and 104b connected to Central Office (CO) switches, 100 and 120, and desktop telephones 108a, 108b and 113a and 113b. PBXs 104a and 104b are preferably conventional voice telephony premise switches. Telecommunication system 10 also includes local area networks ("LAN") 116a and 115b and Link Servers ("LS") 105a and 105b as well as gateways 103a and 103b. Connected to network 115a are data communications gateways 116a and 114a. These allow the IAN 115 to pass packets of information to either the public internet 118 or a private intranet 122. In addition, a tandem 125 can be connected to the Internet 118 through a link server 105*c*.

Web server 123 is connected to the LAN 115*a* to accept web interactions from the local and wide area network connections. A web server (not shown) can also be attached to LAN 115*b* in like manner. Attached to the data networks shown are various communications gateways and VON gateways (103*a*, 103*b*, and 119). Remote telephony networks are tied together using leased private facilities 124 and standard telephones attached to central offices ("CO") such as CO 100. PBXs are connected to the public switching network via T1 or other standard telephony communications methods 110*a* and 110*b*.

The description of the preferred embodiment is from the perspective of the "a-side" or left side of FIG. 1. It would be apparent to those skilled in the art that the description applies to any system having an architecture similar to that shown on the left side of FIG. 1, including the "b-side" or right side of FIG. 1.

Voice telephony traffic enters the switching environment of the PBX 104*a* from many sources. Ultimately these are either from the public switched telephone network ("PSTN") via central office ("CO") 100, private facilities connected 124 to other private switches (e.g., PBX 104*a* through CO 120), voice calls placed within the company's own data communications Intranet 122, or voice calls placed to the company from the public data communications Internet 118.

Traditional telephone voice connections reach individuals or groups within the corporation by the signaling and address information passed through telephony interfaces such as T1 or PRI, both of which are well-known in the art. Alerting and display of calls to users in the corporation is accomplished through desktop instruments such as analog phone 108*a* or multibutton digital display phone 113*a*.

Voice calls from data communications networks can be converted to a traditional voice telephony interface and be presented to enter PBX 104*a* via gateway devices such as gateway device 103*a*. These voice calls can enter the data communications network either from other gateways, such as public network gateway 119 and private network gateway 103*b*, or from Workstations equipped with telephony voice cards, for example workstation 112*a*, equipped with voice card 110*a*. The workstations can be any computer, for example PCs, which can be configured to perform the functions described in the present specification. Such PCs are well-known to those skilled in the art and will not be described further. In addition, voice calls can enter the data communications network from the tandem switch 125 through the LS gateway 105*c*.

Control of signaling for standard telephony is contained in either the voice band as tones passed between devices, out-of-band in associated signaling bits (e.g., in T1 or E1), or in messages contained in a separate data channel (e.g., in ISDN or SS7). Regardless of the telephony technology chosen it is preferable that devices use standard protocols for communication. Such a protocol might involve change of bit value in an associated signaling bit in a T1 channel. On-hook and off-hook are examples of states communicated through T1 A-bit signaling. These states are part of a higher layer protocol of signaling, for instance E&M in the T1 trunking world. In any case, software controlling call processing on switching devices interprets the signaling bit values through time as indications of state changes in telephony protocol. Where messages are available for building telephony protocols call processing state changes are driven by messages and field values within these messages. ISDN's Q.931 message protocol, hereby incorporated by reference in its entirety, is an example of such a message driven protocol.

In the VON telephony standard, message passing protocols exist for building telephony call processing software. The H.323 specification, hereby incorporated by reference in its entirety, is an example of such a protocol.

Figure 4:
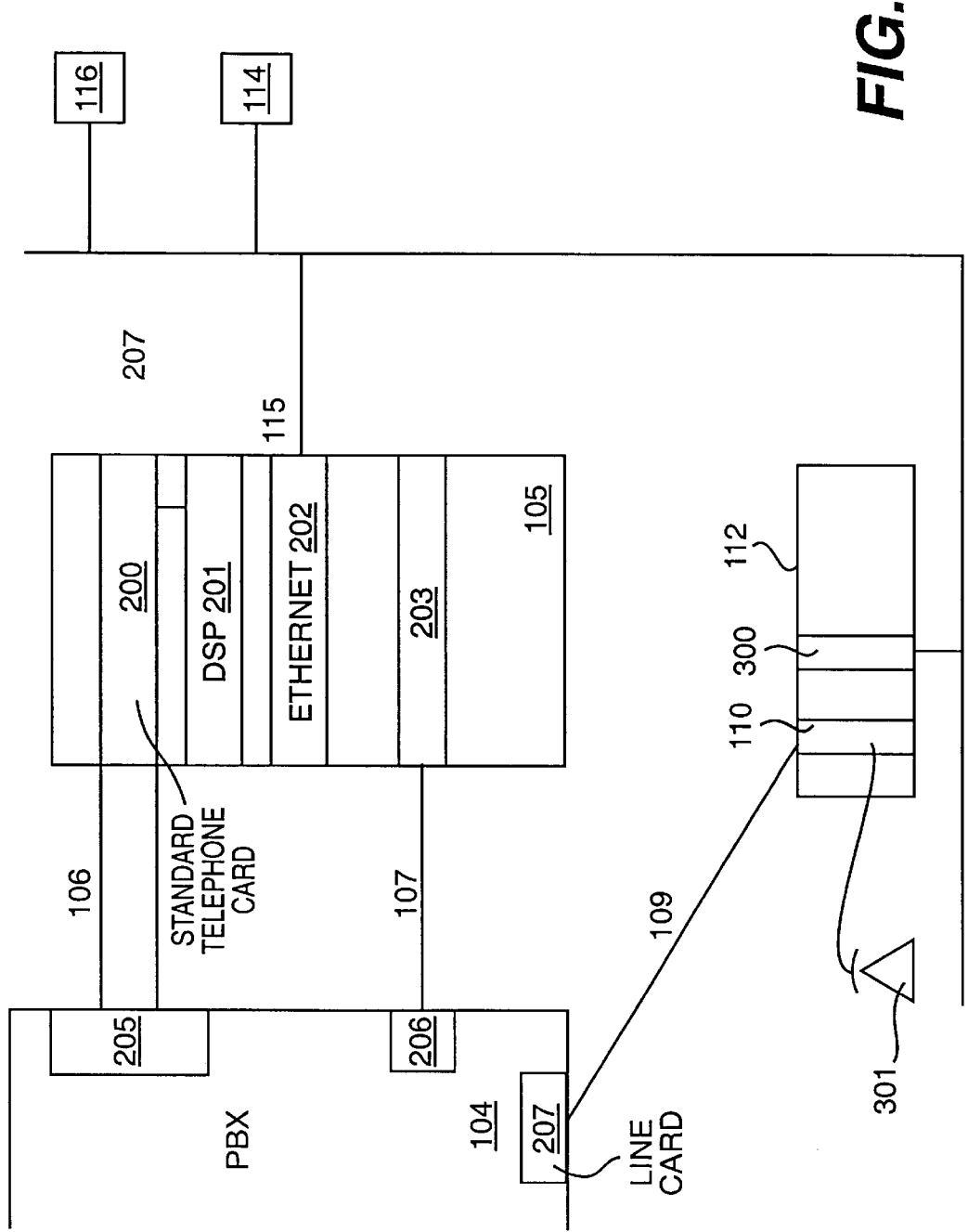
FIG. 4 is a schematic illustration of an LS gateway device according to a preferred embodiment of the present invention.

In the preferred embodiment of the present invention, LS 105*a* coordinates input from switches and VON sources. This coordination results in seamless presentation of telephony and VON calls to users. Referring to FIG. 4, the major components of LS 105*a* are described. LS 105*a* contains both standard telephony hardware such as T1, analog handset, or digital handset telephony interface hardware 200 as well as DSPs 201, Ethernet cards 202, and switch link control capabilities 203. Switch link control is accomplished by sending switch link control commands over serial line 107 to a serial port 206 on PBX 104*a*. Such control is well-known to those skilled in the art. Coordination of traditional telephony call traffic to users through such a server is described in the '668 patent.

Users handle call traffic through their telephony interface software running on their desktop workstations. Calls are presented to their software via messages between the LS and Workstation. These messages can also reflect call processing status of calls presented to the server. Calls originating from VON sources are also presented to the users by the same messages to their telephony interface software.

In standard telephony a call is delivered to a user via a switch-hook transfer, a sequence of signaling messages or signaling bit changes over time accompanied by DTMF tones or by messages to the switching system through a switch link. In VON, call setup is accomplished via messages passed between originating VON processes (remote processes in this example) and the local VON user. In both technologies the link server helps match the remote user to the local user. For example, in a call center the local user may not be known until the call exits the queue (e.g., when the agent (local user in this example) selects a call from the queue for processing). Thus, for a time the link server may become the local user to play messages and collect in-band information from the remote user.

Figure 7:
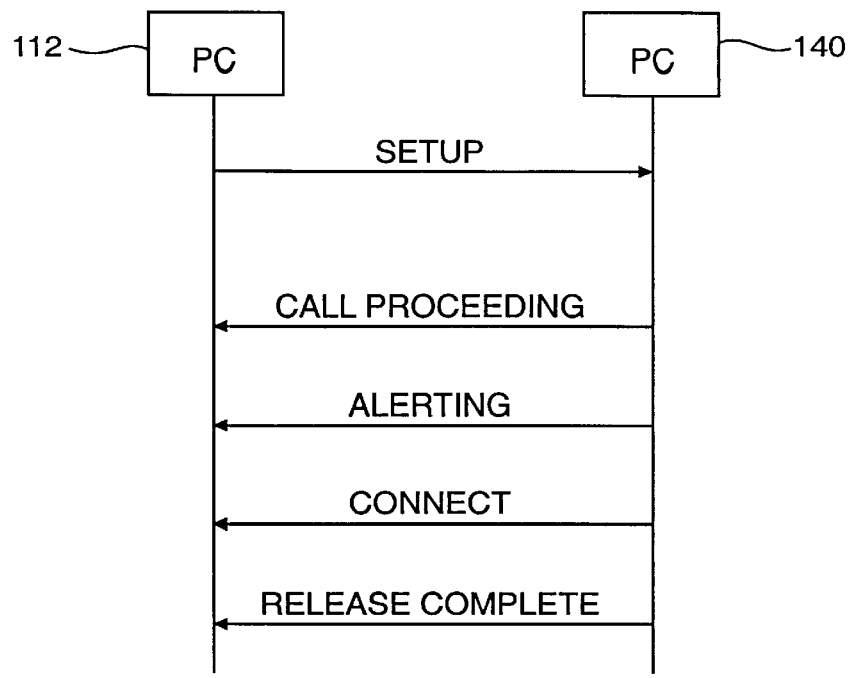
FIG. 7 is a schematic illustration of the message flow a point-to-point call setup for a VON call.

FIG. 7 illustrates schematically call setup message flow for a VON call according to a preferred embodiment of the present invention. This message flow is similar to that described in details of the H.323 message processing, which is available from the International Telecommunications Union's: "Draft Recommendation H.323: VISUAL TELEPHONE SYSTEMS AND EQUIPMENT FOR LOCAL AREA NETWORKS WHICH PROVIDE A NON__ GUARANTEED QUALITY OF SERVICE," hereby incorporated by reference in its entirety. The two endpoints communicate directly with each other. In the present example, a SETUP message is sent from PC 112 to PC 140 over network 115*a*. Messages are sent via the message router 405. A call control process in the workstation, WCP 451, handles the incoming SETUP message. In response, PC 140 sends a CALL PROCEEDING message and an ALERTING message to PC 112. To establish the voice connection through the network a CONNECT message is sent from PC 140 back to PC 112. The CONNECT message carries a transport channel address to which PC 140 can connect to begin communications. In a preferred embodiment of the present invention this is a TCP/IP socket address. For example, in the H.323 standard this is an H.245 Control Channel Transport Address.

The socket address is the repository and source of voice packets carried to and from the Voice card 110a in the PC 140. Packets are moved to and from the socket by software in the driver for the voice card 110a. Packet movement is performed by a method known to those skilled in the art of device driver design. Voice card 110a converts packets to analog audio signal for presentation to a standard telephone or headset 301. The voice card also takes input from telephone 301 (see FIG. 4) and converts it to packets for passing to the socket address. Voice card 110b in PC 112a performs similar functions to enable two way VON voice conversation.

Figure 8:
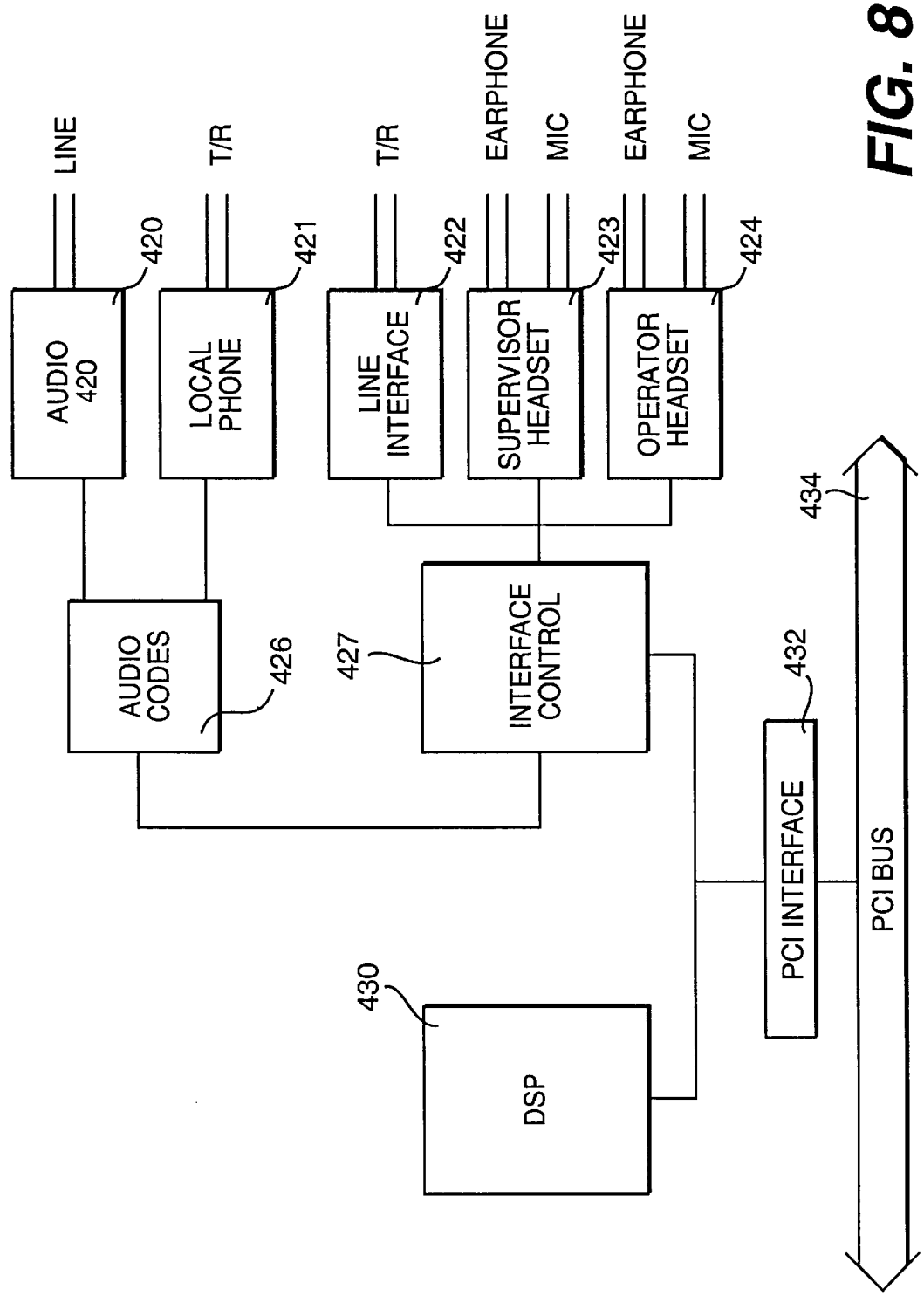
FIG. 8 is a schematic representation of a voice card according to a preferred embodiment of the present invention.

In a preferred embodiment of the present invention a user (e.g., an agent) can add a conversation from another input to a conversation being handled by a voice card, for example voice card 110a. Preferably, voice card 110a has interfaces shown in FIG. 8. Other voice cards in the system preferably have a similar configuration. A local Phone interface 421 may connect to a Tip and Ring or digital telephone interface such as ISDN BRI. Outgoing and/or incoming calls can be handled from this interface. In this example an outgoing call is placed. Code running in the WCP process 451 sends commands to the DSP through a shared memory 429 (not shown) to place an outgoing call. The line interface 422 is put in an off hook condition, dial tone is detected, and touch tones are generated by the DSP 430. The call input on line interface 422 can be conferenced into the VON conversation through conferencing software stored in a DSP memory 431 (not shown) and run on DSP 430. It would be within the knowledge of those skilled in the art of DSP programming techniques to program DSP 430 with the required audio mixing and conferencing software so that a VON conversation can be conferenced as described above.

More calls can be added to the conference call. These calls can be either VON or telephony calls. For example, an additional telephone caller can be added by passing control information to the voice card, for example voice card 110a, to perform a switch-hook transfer. The switch-hook transfer command is followed by the dialing of a dial-string, which may include a feature code such as a conference dial code, to the PBX. This action will add on a telephony caller to the conference call.

A VON party can be added as well. TO add a VON party a VON call is placed as described in the VON call origination message descriptions. Adding the established VON call to the conference is accomplished through conference circuit control on the card.

Adding parties to a conference via telephony devices, such as the PBX, is limited to the number of callers the PBX will support. Adding VON parties to a conference is limited by the processing power of the DSP on the voice card such as voice card 110a on PC 140. Each VON party's voice stream must be decoded to a PCM data stream. This data can then be mixed or otherwise signal processed. Once processed this data must be encoded back to network ready form (for example G723.1 compressed format, which is hereby incorporated by reference in its entirety).

Figure 5:
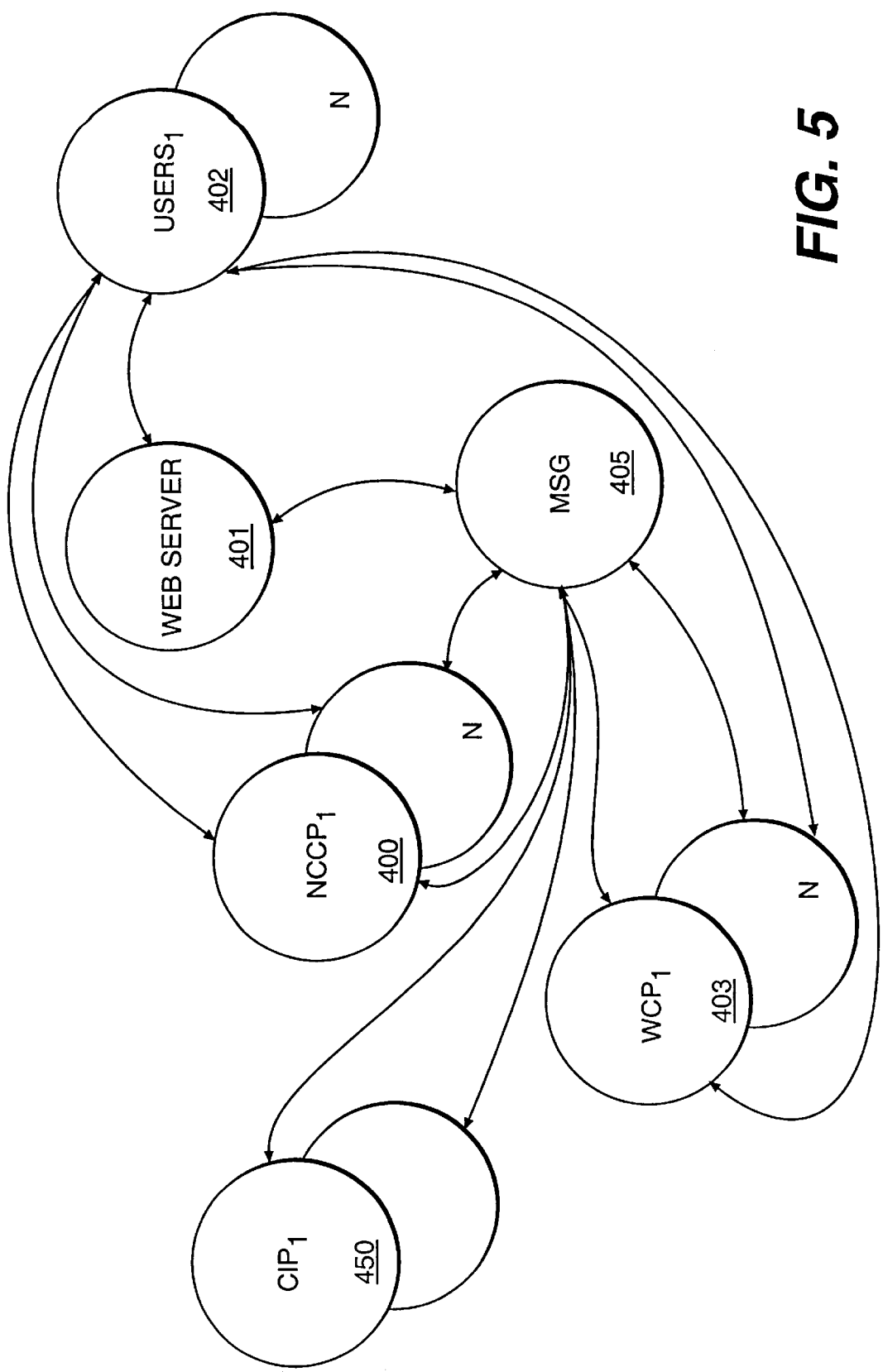
FIG. 5 is a schematic illustration of the software architecture executing in the LS gateway device according to a preferred embodiment of the present invention.

The present invention allows versatility in telephony call control. For example, in the conference call example discussed above, a telephony call can be added to the conference by using a Switch Link Proxy Process (SLPP 406) executing on an LS, such as LS 105a. The SLPP 406 process receives messages through message router 405 (FIGS. 3 and 5) to affect call control in the telephony network by sending control messages to PBX 104a. This interface is bidirectional. That is, SLPP 406 also receives messages from PBX 104a and passes them to WCP 451 processes in the workstations. These messages are used to both monitor devices in the switch and cause device control actions.

Figures 11A, 12:
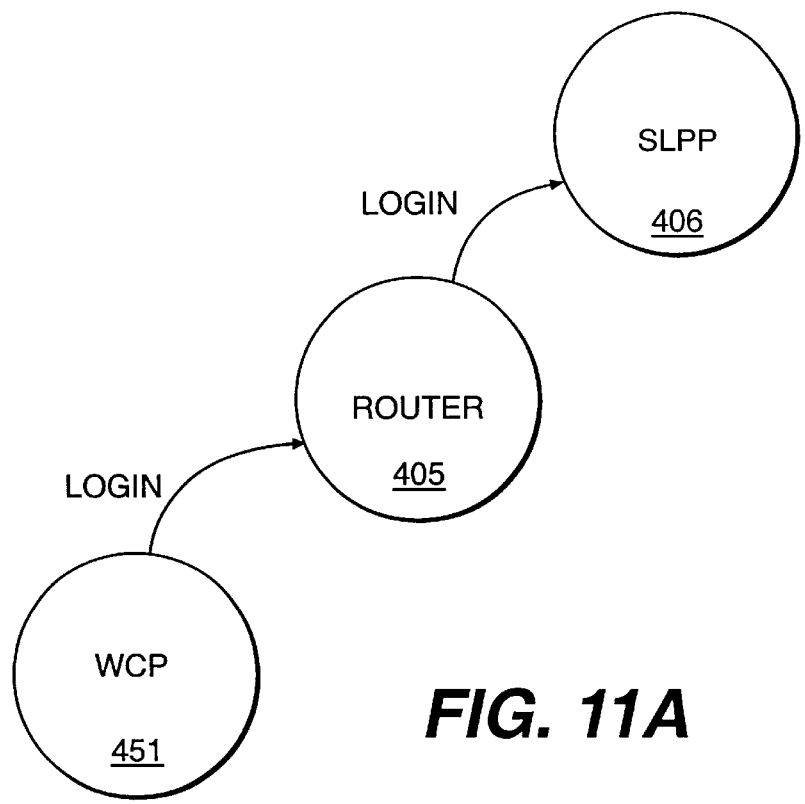
FIG. 11A is a schematic illustration of WCP registration according to a preferred embodiment of the present invention.
FIG. 12 is a schematic representation of a routing table according to a preferred embodiment of the present invention.

In a preferred embodiment of the present invention, the SLPP 406 must maintain a map table of circuit identifiers in PBX 104a to the WCP 451 process ID's. This map is created at initialization of the WCP 451 software by the local user. The map creation process is illustrated in FIG. 11A. Referring to FIG. 11A, WCP 451 registers with message router 405 and the SLPP 406 when it is initialized by sending a LOGIN message to message router 405. Message router 405 forwards the LOGIN message to the SLPP 406 process so it can make a map entry. The PBX circuit ID must be known to the WCP 451 process at initialization time. This is entered into WCP 451 by the installer. Message router 405 sends a REGISTER-OK (confirmation) message back to WCP 451 when registration is successfully completed.

Figure 11B:
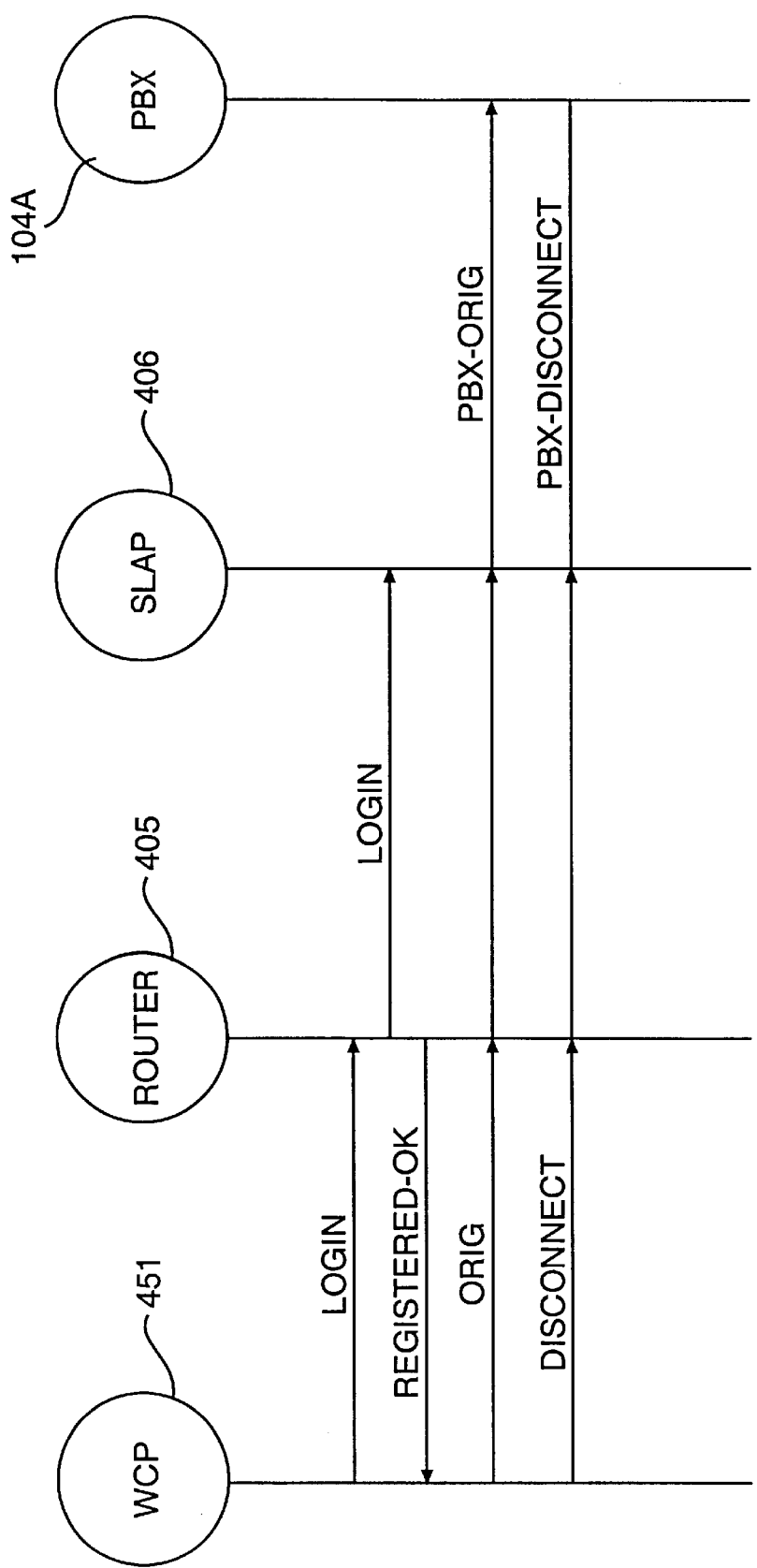
FIG. 11B is a schematic illustration of call distribution using an SLPP according to a preferred embodiment of the present invention.

FIG. 11 shows how a call is placed from WCP 451 by sending an ORIG message through message router 405 to the SLPP 406 to PBX 104a. The ORIG message is an origination message. This call may be added to the conference by configuring the voice card 110 through the software driver interface discussed above. When the call is completed the PBX sends a DISCONNECT message through SLPP 406 to message router 405, which forwards the DISCONNECT message to WCP 451. WCP 451 then ends the call from the workstation software's point of view. Any screens, displays, etc are reset to show the call is finished.

Incoming calls may be answered and added to the conference by selection from a list of queued calls presented through the LS 105a in a manner described in the '668 patent. Calls are either held at the LS 105 in ports on standard telephony cards 200 or held in PBX 104a. Calls held in PBX 104a are controlled or monitored through messages passed between the LS 105a and the PBX 104a over switch link 107. Switch link 107 is shown in FIG. 4 as a serial port interface to a serial card 206 in the PBX. It would be apparent to those skilled in the art that switch link 107 can be implemented using a number of communication methods, including Ethernet or TCP/IP socket connections.

To move a call from the LS 105a which is held on a port at a telephony interface card 200 an ACCEPT message from WCP 451 in PC 112 is sent to the CCP 450 process controlling the call. CCP 450 sends commands to the card 200 to cause a transfer of the call to the line 109 connected to the card 110 in PC 112. The telephony interface card 200 then passes signaling information to the PBX—this could be switchhook flash and DTMF or a digital signaling information used in T1 or digital handset.

If a switch link such as switch link 107 is used, rather than direct control by the telephony interface card the signaling scenario is the same. Messages between WCP 451 and CCP 450 processes are the same. However, the transfer is accomplished by messages sent from the CCP 450 process to the SLPP 406 process to the PBX.

Figure 9:
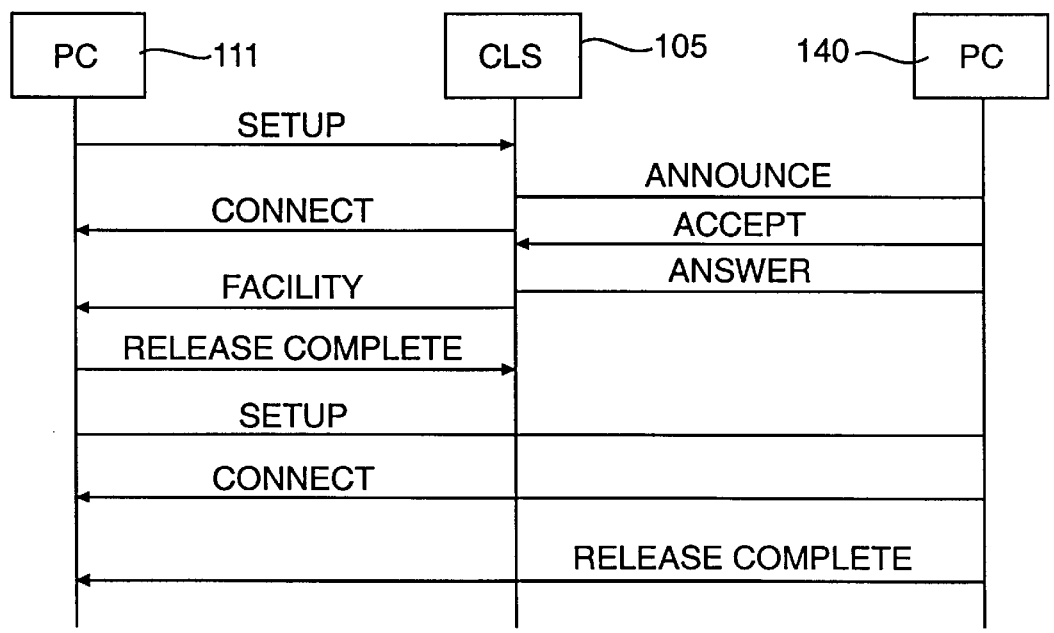
FIG. 9 is a schematic representation of call distribution message flow according to a preferred embodiment of the present invention.

In addition to the point-to-point calls that are discussed above, Web server 123 or Link Server 105a can be used to set up calls from either the VON domain or the telephony domain. LS gateway 105a can be used to set up VON calls or even queue VON calls by taking SETUP messages from remote VON user processes 402 and passing connect messages back to LS 105a. FIG. 9 shows how LS 105a can answer, queue, and distribute a call in a call center. A SETUP message is passed to a Network Call Control Process (NCCP) 400 in LS 105a from WCP 451 in PC 111. LS 105a sends a CONNECT message back to PC 111 so as to answer the call. The LS 105*a* may now play messages to PC 111 via the VON voice path. At this time an ANNOUNCE message is broadcast through the message router 405 to all WCP 451 processes such as WCP 451 executing on PC 140. Software in WCP 451 processes displays calls to agents at these workstations in a manner similar to that described in the '668 patent. An agent wishing to take the call will select it through the WCP 451 user interface. When an agent selects a call for processing from the queue, an ACCEPT message is generated and sent back to NCCP 400. The ACCEPT message a Call Signaling Channel Transport Address (CSCTA). NCCP 400 is now able to distribute the call. It passes a FACILITY message back to the WCP 451 process in PC 111 to inform this process of the intent to change the destination of the call. The WCP 451 process responds with a RELEASE COMPLETE message back to the LS 105*a* to end this call. The WCP 451 process next sends a SETUP message to PC140. A CONNECT message is returned to complete the transfer of the call. When the call is completed, PC 140 can send a RELEASE COMPLETE message to PC 111 to end the call.

Figure 10:
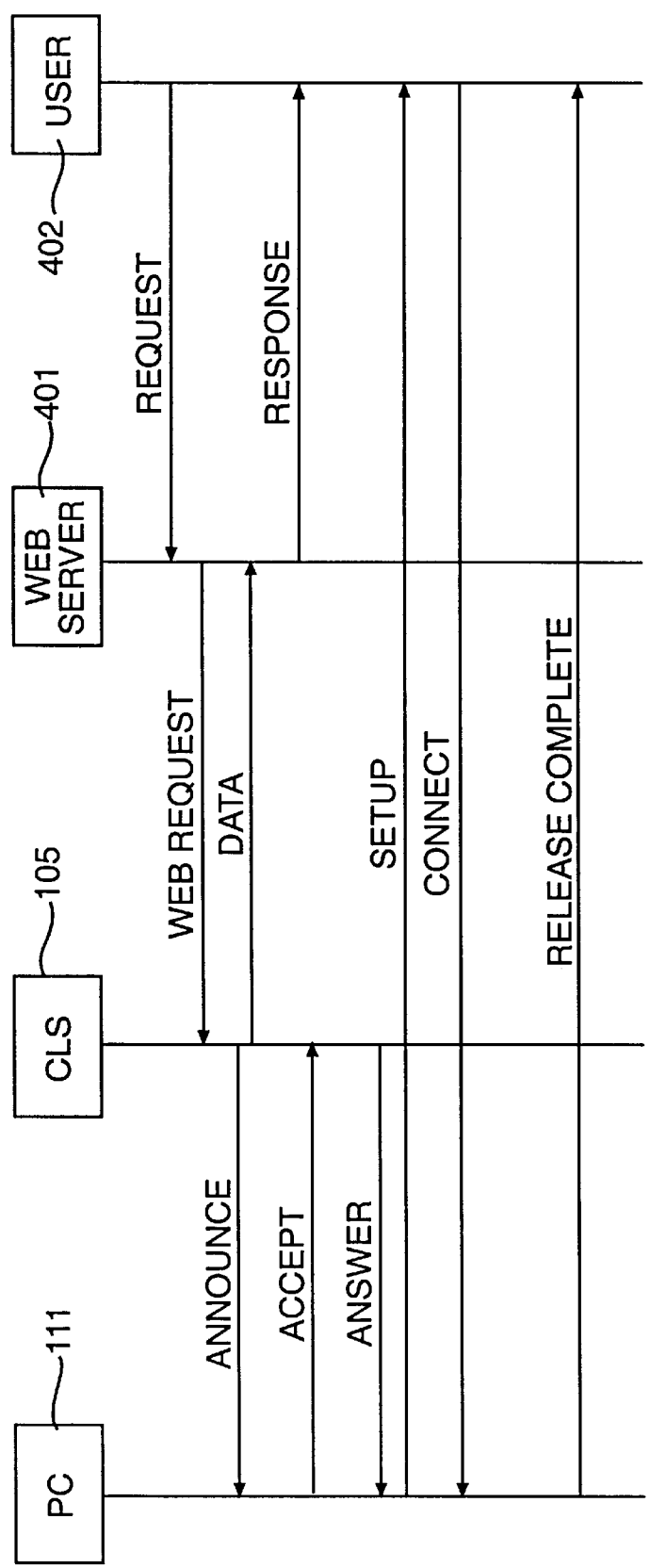
FIG. 10 is a schematic illustration of message flow for call distribution using a web server according to a preferred embodiment of the present invention.

In VON, Web server 401 can also play an important part in distribution of a VON call. For example, a remote user browsing a web site desires to establish a VON call to a person or to a call center in a company. In a preferred embodiment of the present invention, Mustrated in FIG. 10, information including the CSCTA of the user is passed from a User 402 to the Web Server 401 in a REQUEST message. Web server 401 passes this information and other information about the User 402 entered during interactions in the Web Server 401 to the NCCP 400 process running on LS 105 in a WEB_REQUEST message. Data regarding the call handling time, such as position in queue, is passed back to the Web Server as a stream of DATA (See HTTP 1.1 Proposed Standard RFC 2068, hereby incorporated by reference in its entirety, as an example of Web and Browser interaction messaging). This queue information is then passed to the User 402 in a RESPONSE message from the Web server. After the DATA message is sent the NCCP 400 process sends an ANNOUNCE message through the message Router 405 to all the WCP 451 processes such as WCP 451 executing on PC 111. A user corresponding to one of the WCP 451 processes selects the call. Upon selecting the call, an ACCEPT message is sent from the WCP process requesting the call to the NCCP 400. NCCP 400 sends an ANSWER message to all the WCP 451 processes to manage their call list information. The WCP 451 process electing to take the call takes the CSCTA value from this message and other address information of the USER 402 and sends a SETUP message directly to it. The User 402 sends a CONNECT back to complete call setup. When the call is complete, WCP 451 in PC 111 sends a RELEASE COMPLETE message to user 402 to end the call.

The present invention also applies to other media routing. Although the PBX and switching infrastructure this invention is designed to supplement and enhance delivery of voice media, the VON call routing discussed herein can be applied to video or data conferencing. One of the key technologies leveraged by this invention is H.323 call control messaging. This specification also allows other media extensions. Coordinating the setup and tear-down of media sessions is perhaps a better way of describing the capabilities of H.323. This invention makes it possible to blend this type of media control with existing switching systems in either a single or multi-center environment.

In addition the present invention applies to multi-center environments. Servers in remote sites need to pass call processing messages to effect a seamless control structure between local and remote agents. To accomplish this, message router 405 needs to contain message ports to remote message routers in remote link servers. Link servers register with each other to enable a communication path between sites. Messages are sent to a remote router executing on a remote link server to inform it of the need to pass call processing messages based on certain filter criteria. For example, the filter criteria can be agent specific, call-type and/or maintenance. It would be apparent to those skilled in the art that other filter criteria can be used.

Message router 405 must keep a table containing remote router ID's (and their associated port ID) and message passing filter information. FIG. 12 shows entries in an example routing table 1201. Referring to FIG. 12, routing table 1201 preferably contains four fields: remote route ID, remote port number, filter type and filter value. The remote router ID identifies with which remote message router message router 405 is in communication. The remote port number corresponds to the port number of the remote message router with which message router 405 is in communication. The filter type is the filter criteria to filter out message of a specific type. The filter value is the value associated with the filter type for more specific message filtering. Filtering can be preformed with respect to the sender and/or receiver. Thus, the filter can affect message prior to their sending and/or upon their receipt. The purpose of the filter is to keep network traffic between message routers to a minimum, but is not necessary to practice the present invention.

A ROUTER_LOGIN message sent between two Router 405 processes results in an assignment of a port and initial entry in the table. A ROUTER_SET message between two Router 405 processes places an entry in the table which sets Filter Type and Value.

Entries in routing table 1201 are consulted when the Router 405 processes a message. Typical Router message processing is described in the '668 patent. Processing of entries in this table constitute an additional step to this processing. This additional step includes consulting the table first for the presence of any Router ID's and checking message values against filter values for a decision on whether to pass the message on to the remote Router 405 process. This filtering and table management is necessary in order to build linked multi-center communications systems. Without such a scheme the message traffic between the sites would grow exponentially—severely limiting the number and size of remote centers which could be linked together.

Figure 2:
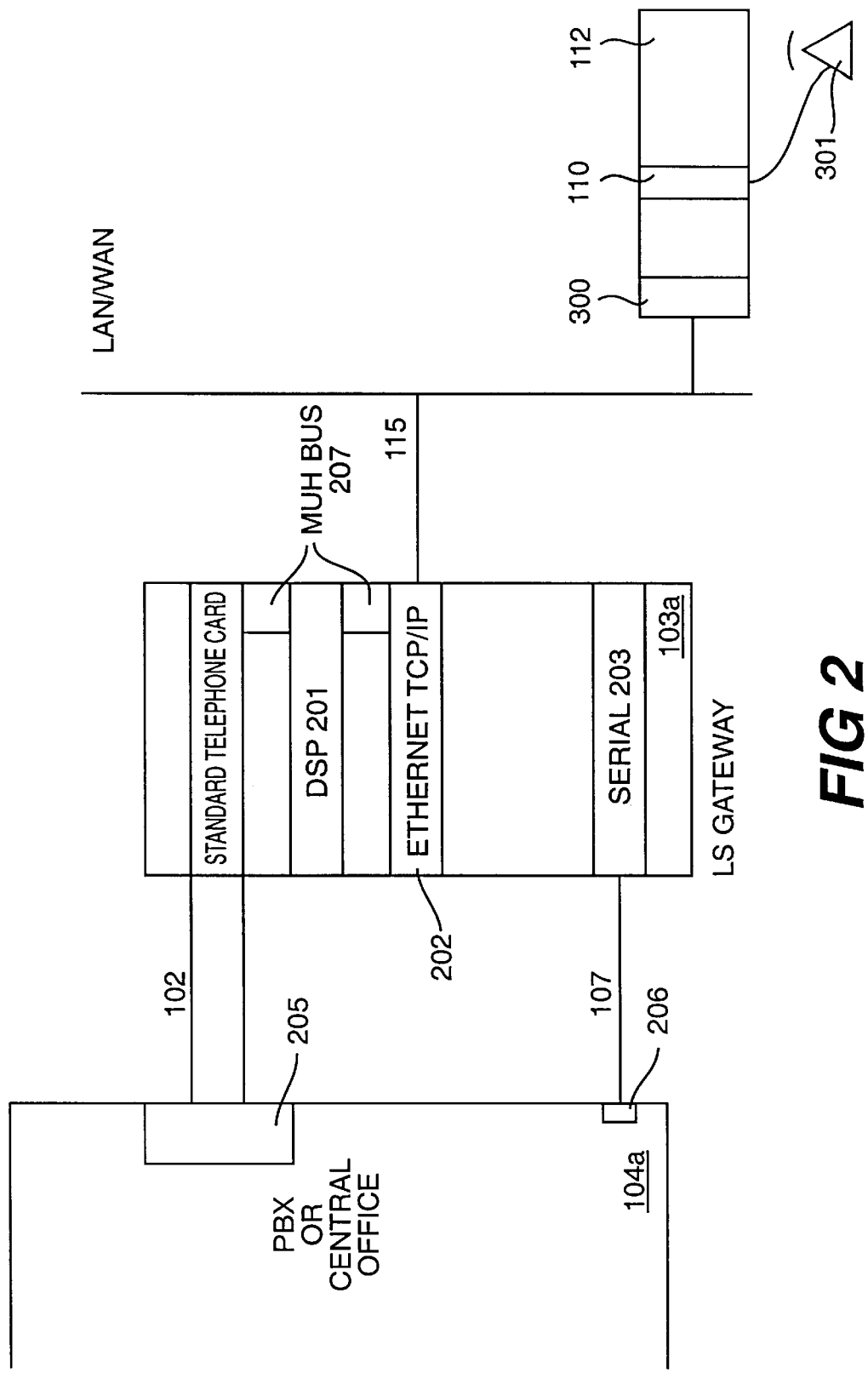
FIG. 2 is a schematic illustration of an LS gateway device according to a preferred embodiment of the present invention.
Figure 3:
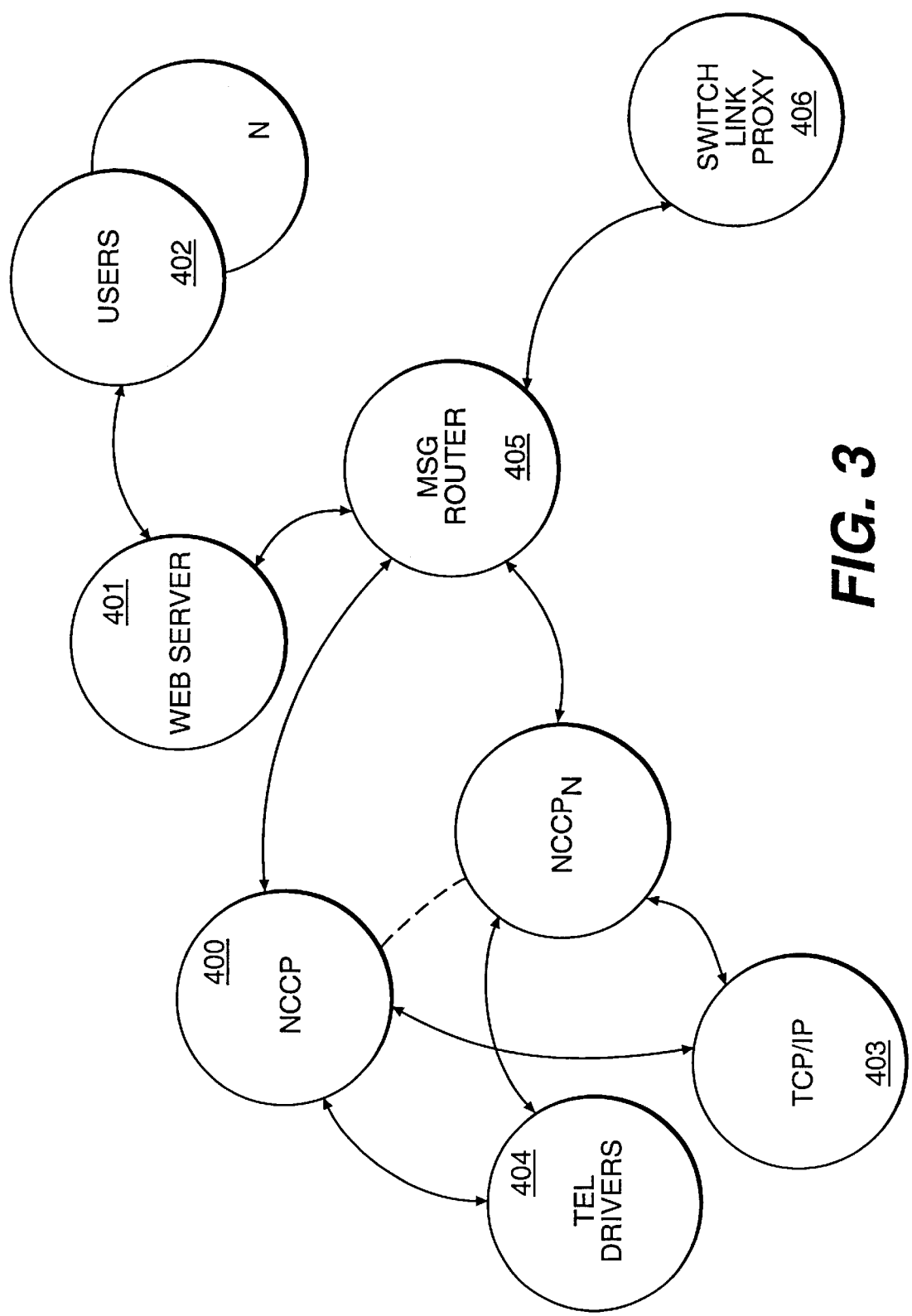
FIG. 3 is a schematic illustration of the software architecture executing in the LS gateway device according to a preferred embodiment of the present invention.

The addition of link servers and WCP processes makes it possible to build virtual dialing plans and virtualize the communications addressing and connectivity between diverse switching environments. Adding the capabilities of NCCPs 400, voice cards such as voice cards 110*a* and 110*b* and link servers such as link servers 103*a*, 105*a*, 103*b* and 105*b* makes it possible to blend VON or media on network into the virtualized communications described. In addition, a customer can migrate all communications to the network devices LS 105 and PC 112 with voice card devices. This is illustrated in FIGS. 2 and 3 where calls from PBX 104*a* are passed to LS Gateway 103.

Messages are passed to setup calls as described above. WCP 451 processes such as those running in workstation 112 receive and process these messages as before with the exception of the voice path. Voice card 110 is configured in this scenario so that the voice path is performed by packet delivery over the network between voice card 110 and a port on the Ethernet TCP/IP 202 card in the LS Gateway 103. The combination of Standard telephony card 200, DSP card 201, and Ethernet TCP/IP 202 card are like those provided by Natural Microsystem's Fusion product. An example Standard telephony card 200 is Natural Microsystems (NMS) ATI 24 card, DSP 201 card NMS's AG-RT Daughter card, Ethernet TCP/IP 202 card NMS's TX2000 IP router card. These cards convert standard telephony signaling to packetized messages controllable by software such as that described in this invention. The compression and coding schemes used on these cards need to match those used at the PC 112 and Card 110.

Figure 13:
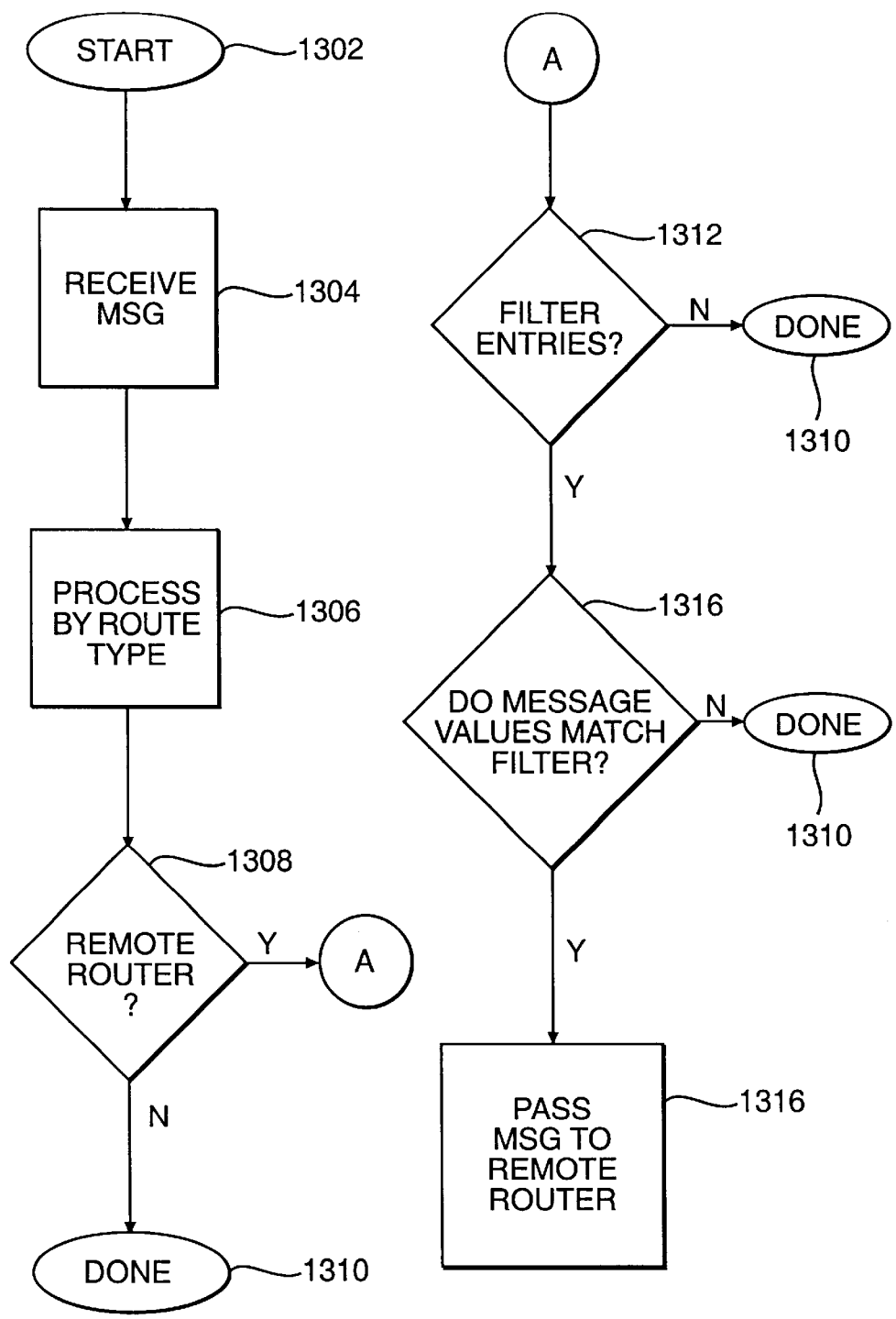
FIG. 13 is a flow chart for message filtering according to a preferred embodiment of the present invention.

FIG. 13 is a flow chart representative of a process executed in by message router 405 prior to sending a message to a remote message router according to a preferred embodiment of the present invention. To send a message, message router begins in start step 1302, whereupon it immediately enters step 1304. In step 1304, message router 405 receives a message to send. It then processes he message by router identification in steps 1306 and 1308. If the message is for a remote message router, then it continues in step 1312, else there is nowhere to send the message and it ends in done step 1310. After determining where to send the message, message router 405 checks filter type in step 1314 to determine if the receiver is a receiver of the correct type. If not, the router is finished and proceeds to done step 1310. Otherwise, the router checks the filter value to determine if the receiver value is correct for the remote router. If not message router 405 stops processing the message and proceeds to done step 1310. If the message has the correct filter value, message router 405 sends the message to the remote router in step 1316.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for blending telephony call traffic with voice on network call traffic for distribution to one or more agents in a call center, comprising:

a link server having one or more telephony ports to receive the telephony call traffic on the link server;

a computer network to which the link server is connected over which the voice on network call traffic is transmitted to the link server; and a routing process for controlling the one or more telephony ports to control routing of the telephony call traffic; and to control routing of the voice on network call traffic by distributing the voice on network call traffic and the telephony call traffic to the one or more agents in the call center along with said call-related information.

2. The system as recited in claim 1, further comprising a public branch exchange (PBX), wherein said routing process routes the telephony call traffic to said PBX for distribution to said or more agents in said call center.

3. A method for blending telephony call traffic and voice on network call traffic for distribution to one or more agents in a call center, comprising the steps of:

(a) routing the telephony call traffic to one or more ports on a link server;

(b) transmitting the network call traffic to the link server in one or more. messages over a computer network;

(c) extracting call-related information from said telephony and voice on network call traffic; and (d) distributing said telephony and voice on network call traffic to the one or more agents in the call center along with said call-related information.

4. The method recited in claim 3, further comprising the step of routing the telephony call traffic through a PBX.

5. A system for distributing telephony and voice on network call traffic to one or more agents in a call center, each agent operating an agent computer, comprising:

a link server;

a voice card located on said link server for holding the telephony call traffic, while the link server determines where the telephony call traffic should be routed;

a memory for holding the voice on network call traffic while the link server determines where the voice on network call traffic should be routed; and a message router for sending control messages to distribute the telephony and voice on network call traffic to said one or more agents.

6. The system recited in claim 5, further comprising a PBX through which the telephony call traffic is transmitted to distribute the telephony call traffic to said one or more agents.

7. The system recited in claim 5, further comprising an interactive voice response process to obtain information regarding specific calls in the telephony call traffic, wherein the link server distributes the telephony call traffic in accordance with the information so obtained.

8. The system recited in claim 5, further comprising an interactive voice response process to obtain information regarding specific calls in the voice on network call traffic, wherein the link server distributes the voice on network call traffic in accordance with the information so obtained.

9. The system recited in claim 5, further comprising a process for displaying a list of each call in the held telephony traffic and voice on network call traffic, wherein an agent of the one or more agents can select a particular call to the states, and wherein the message router causes the call to be sent to the agent after the agent's selection.

10. The system recited in claim 9, wherein the telephony and voice on network call traffic are held in a single queue.

11. A method for distributing telephony and voice on network call traffic to one or more agents in a call center, each agent operating an agent computer, comprising:

holding the telephony traffic on a link server while the link server determines where the telephony traffic should be routed;

holding the voice on network traffic in a memory on the link server while the link server determines where the voice on network traffic should be routed; and sending control messages to distribute the telephony and voice on network call traffic to said one or more agents.

12. The method recited in claim 11, further comprising the step of transmitting the telephony traffic through a PBX through to distribute the telephony call traffic to said one or more agents.

13. The method recited in claim 11, further comprising the steps of:

interactively obtaining information regarding specific calls in the telephony traffic; and distributing the telephony traffic in accordance with the information so obtained.

14. The system recited in claim 11, further comprising the steps of:

interactively obtaining information regarding specific calls in the voice on network traffic; and distributing the telephony traffic in accordance with the information so obtained.

15. The method recited in claim 11, further comprising the steps of:

displaying a list of each call in the held telephony traffic and voice on network traffic; and selecting a particular call from the list, and wherein the message router causes the call to be sent to the agent after the agent's selection.

16. The method recited in claim 15, wherein the telephony traffic and voice on network traffic are held in a single queue.

17. A system for distributing telephone calls to one or more agents in a call center, comprising:

a computer server;

one or more telephony interface cards installed in said computer server to receive and to hold one or more telephony calls;

a memory on the computer server for receiving and holding one or more voice on network calls;

a message routing process executing on the computer server for controlling routing of the one or more telephony calls and the one or more voice on network calls to the one or more agents.

18. The system recited in claim 17, further comprising a PBX through which the telephony calls are routed to the one or more agents.

19. The system recited in claim 17, further comprising an interactive voice response unit to obtain information related to the telephony calls.

\* \* \* \* \*

UNITED STATES PATENT AND TRADEMARK OFFICE
CERTIFICATE OF CORRECTION

PATENT NO.        : 6,226,287 B1  
APPLICATION NO. : 09/156689  
DATED             : May 1, 2001  
INVENTOR(S)       : Patrick K. Brady Page 1 of 1

It is certified that error appears in the above-identified patent and that said Letters Patent is hereby corrected as shown below:

On the Title page of the patent at Item (63) line 2, change "continuation" to --continuation-in-part--

On the Title page of the patent at Item (60) change "Sep. 17, 1997" to --Sep. 18, 1997.--

Signed and Sealed this

Twelfth Day of August, 2008

JON W. DUDAS  
*Director of the United States Patent and Trademark Office*